United States Patent Office 3,480,998
Patented Dec. 2, 1969

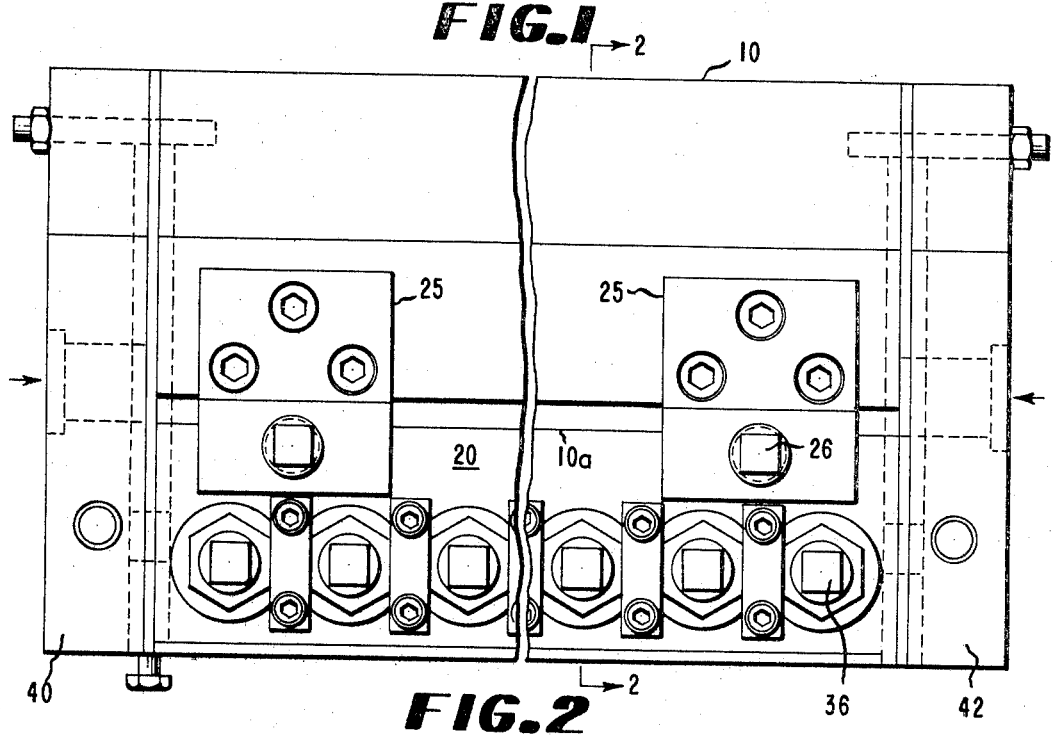
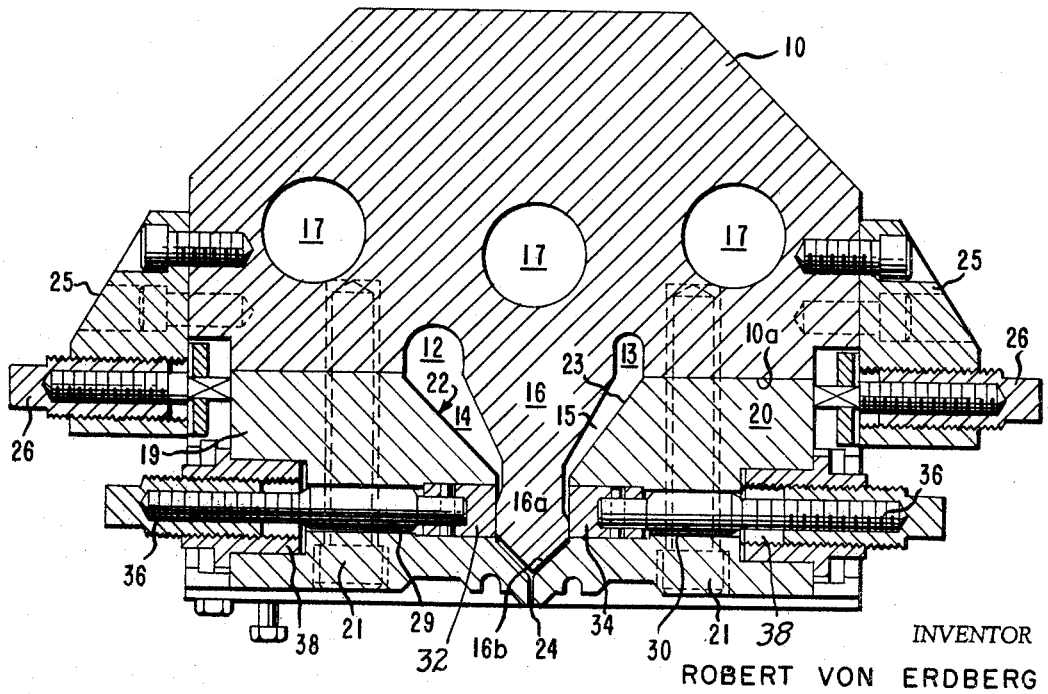

3,480,998
EXTRUSION HOPPER
Robert von Erdberg, Buffalo, N.Y., assignor to E. I. du Pont de Nemours and Company, Wilmington, Del., a corporation of Delaware
Filed Mar. 3, 1967, Ser. No. 620,345
Int. Cl. B29f 3/00
U.S. Cl. 18—12                                    8 Claims

ABSTRACT OF THE DISCLOSURE

An extrusion hopper for making a film of a plurality of layers, the extrusion channels in part being defined by flexible, adjustable bars for better product control.

BACKGROUND OF THE INVENTION

Extrusion hoppers for producing films composed of a number of layers are known. Examples of such structures can be found in United States patents to Beck, No. 2,901,770, and to Senecal, No. 3,151,356. The present invention is an improved apparatus of this general type.

SUMMARY OF THE INVENTION

In the present invention, extrusion hoppers for producing a film composed of a plurality of layers, i.e. two or three or more, are provided with elongated, flexible, adjustable bars that, in part, define the extrusion channels. The flexibility and adjustability of these bars permit control of each film layer as it is being extruded for better overall product control.

The invention will be described in conjunction with the attached drawing in which, FIGURE 1 is a side elevation of an extrusion hopper of the invention;

FIGURE 2 is a vertical sectional view taken along the line 2—2 of FIGURE 1; and

Figure 3:
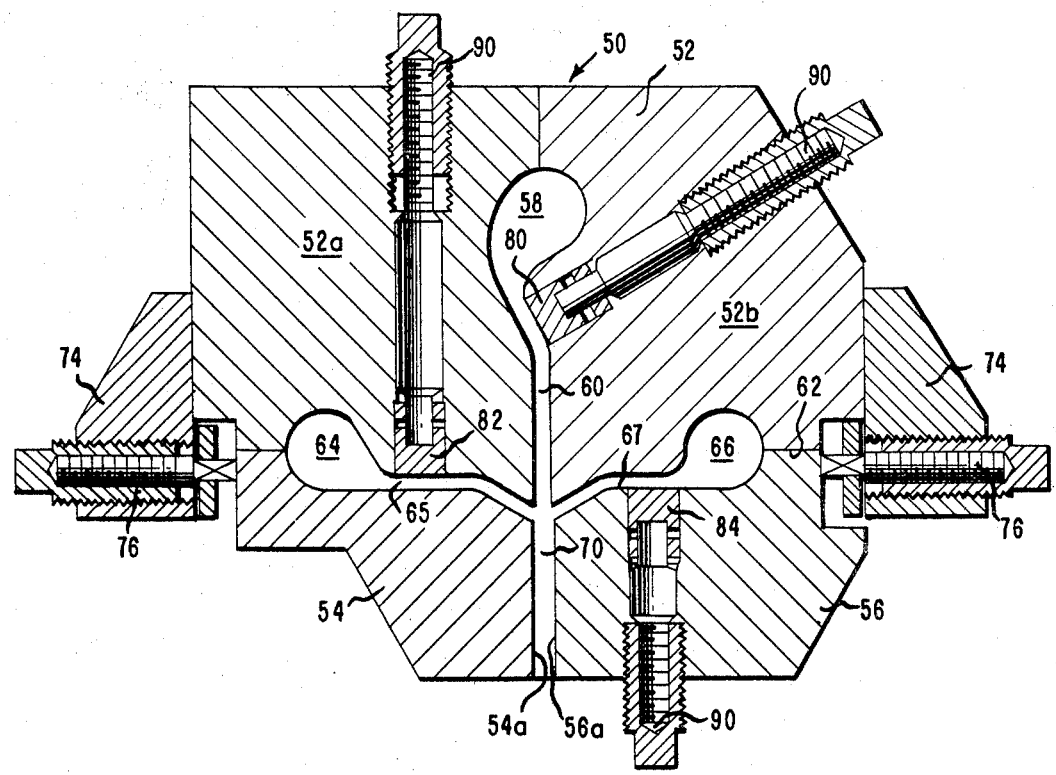
FIGURE 3 is a view, in elevation, of a section of an extrusion hopper of the invention in which a three-layer film is produced.

In FIGURES 1 and 2, like reference numerals refer to like parts throughout the views.

Referring now to FIGURES 1 and 2, the extrusion hopper shown includes an elongated body 10 having two spaced lengthwise chambers 12 and 13, the bottom portions of which communicate with narrowing lengthwise channels 14 and 15, respectively. The channels 14 and 15 have smooth inner walls which converge to form a tongue 16 that protrudes downwardly from the body 10. Chambers 12 and 13 can be of identical size and shape or they can be different, the latter being generally preferable where the thicknesses of the individual layers of the film to be produced are significantly different. The tongue 16 shown is wedge-shaped as it extends from body 10, has an intermediate zone 16a that is generally rectangular and its terminal portion is wedge-shaped to its end or apex 16b. Other tongue and channel shapes could as well be used.

Throughout the elongated body 10 are a number of longitudinal passages 17. These can be used for the circulation of heat-exchange fluid, the reception of electrical cartridge heaters or other means to provide temperature control in the apparatus.

On each side of tongue 16 and detachably secured to the flat bottom surfaces 10a of the body 10 are lip members 19 and 20. Consistent with the limitation imposed with the design of chambers 12 and 13 and channels 14 and 15, the lip members suitably are as identical in construction as possible but are reversed in position. These lip members have flat upper surfaces which fit against the corresponding flat surfaces 10a of the bottom of the body 10. The interfitting surfaces are carefully machined so that they will fit closely together. If desired, a suitable gasket (not shown) may be placed between the surfaces.

The lip members 19 and 20 are attached to the body member 10 by a plurality of stud bolts 21, which extend through surfaces 10a and threadably engage the body member 10. The stud bolts, as shown, can have a polygonal head for the reception of a wrench. The stud bolts and their receptacles are adapted to permit adjustment of the lip members toward or away from the tongue 16.

The central walls 22 and 23 of the lip members 19 and 20 are machined or shaped to coact with the adjacent portions of the tongue 16 to define the fluid extrusion channels. At their lower portions, each lip member extends beyond the apex 16b of the tongue 16. At this point the lip members 19 and 20 converge and coact with one another to form a common, single, elongated extrusion orifice 24. The coacting surfaces of the lip members defining orifice 24 are parallel.

As noted above, each lip member is adjustable with respect to the tongue 16. Accordingly, the body member 10 is provided, by support members 25, with a plurality of differential adjusting screws 26 by which the lip members can be advanced toward the tongue 16 when desired. These screws 26 are located at each end of the lip members and are used to align the lips by moving them relative to each other such that the walls of the orifice 24 are parallel, thus permitting primary gauge control of the film being produced. The substantial distance between the apex 16b and orifice 24 is advantageous in that the two layers of the film are joined within the device and are exposed for a finite period to the extrusion temperatures and pressures therein and accordingly a strong bond is developed before the film is extruded into the surrounding atmosphere. A large number of adjusting screws can be used to advantage to avoid effects of the internal fluid pressure and to avoid possible elastic deflections. The taper of the threads, pitch of the threads and the mechanical lever ratio can be selected to give the desired advantage between screw rotation and lip movement, as is apparent.

In lip members 19 and 20 are slots or recesses 29 and 30, respectively, which are adjacent that portion 16a of the tongue 16 where it is generally rectangular in vertical section. Elongated bars 32 and 34, of the length of the body member 10, are snugly received in recesses 29 and 30. These bars serve, with the corresponding adjacent portion 16a of the tongue, to define the fluid extrusion channels at that location. Each of bars 32 and 34 has associated with it adjusting screws 36 that are supported by the lip members and extend through recessed holes 38 in those members. Such screws are preferably in a row and are uniformly spaced. The screws are employed to urge the bars 32 and 34 toward or away from the tongue 16, as desired, whereby the channel dimensions at that location can be adjusted. In this fashion, the bars, coacting with the corresponding parallel walls of the tongue, provide an independent flow adjustment for each of the fluid extrusion channels without changing the orifice-defining final aperture 24. This bar adjustability permits control of the thicknesses of the component layers of the film being produced as well as control of the throughput being effected which might otherwise be adversely affected by uneven melt fluid pressures, temperatures and viscosities, etc.

Through the combination adjustability of the lip member screws 26 and the bar member screws 36, a continuously accurately dimensioned film is obtained, both in total gauge and individual component layers.

The bar members 32 and 34 preferably are rectangular in cross-section, uniform along their length and thin. By reducing the thickness of the bars to a minimum, it is easier to obtain the necessary flexibility in the bars so that flexing can be achieved from screw to screw and movement in the bars by any screw 36 is largely confined to the small portion of the bar immediately associated with that screw. The bars have flat inner surfaces which facilitate securing good control of the extrusion channel dimensions that the bars and the adjacent rectangular portion of the tongue define. However, it should be evident that other shaped bars and tongue zones can be employed if desired. The space between the bars and the tongue, i.e. the fluid extrusion channels, normally is made proportional to the desired thickness of the film layer of the intended product.

The vertical part of the walls of the rectangular portion of tongue 16 coacting with the respective bars held in the lip members, can (as is shown) be of different heights, depending primarily on the corresponding fluid melt passage and channel size. At a given rate of throughput of fluid, control is more sensitive by using a higher wall height with the broader channel.

The body member 10 is provided with end plates 40 and 42 which can be journalled in a suitable bearing in a frame to support the hopper. The end plates are provided with passages which communicate with the longitudinal fluid chambers 12 and 13 in the body 10 as well as suitable fittings and pipes for supplying fluid melt to the passages and the heat exchange zones. If desired the end plates can be eliminated and heaters and pipes can be attached directly to the body 10 with any spaces at the ends of the lips being closed as with a gasket or shim.

In assembling the apparatus, the lip members are aligned with the approximate spacing desired and then the width of the channel orifice 24 between the lip members beyond the apex 16b of the tongue is adjusted and the lips set parallel by use of adjusting screws 26; the lip members are fixed in that position by tightening stud bolts 21. The end plates 40 and 42 are then securely fixed to the assembly. This may be done after the primary gauge of the lip members has been set without concern for retaining lip edge flexibility (as heretofore), since gauge can be adjusted by adjusting the bar members 32 and 34 to control fluid flow and is essentially independent of orifice contour. The bar members are then set by use of the adjusting screws 36 as described above.

The preparation of a two-layer film with the hopper of this invention is accomplished with the compositions, operating conditions and the like that have been used with prior devices, as is indicated in the following examples.

A 14-inch long hopper as described above was used to produce a two-layer polyvinyl fluoride film as follows: A standard 2⅛″ extruder was connected to the larger channel (base layer) of the hopper using appropriate adaptors. Standard filter and extrusion valves were used. A 1″ extruder was mounted and connected to the smaller channel of the hopper. Pressurized feed systems were used to supply the blends to both extruders. The base film layer as cast was composed, in weight percent, of:

| | Percent |
|---|---|
| Polyvinyl fluoride | 33.1 |
| Pigment titanium dioxide | 6.4 |
| "Epon 1004"-thermostabilizer | .4 |
| Triphenyl phosphite | .1 |
| N,N-dimethylacetamide | 60.0 |

The top layer as cast was composed, in weight percent of:

| | Percent |
|---|---|
| Polyvinyl fluoride | 36.0 |
| UV screen-poly - 4 - methacryloxy-2-hydroxy benzophenone | 2.0 |
| "Celite Super-Floss" | 2.0 |
| N,N′-dimethyl acetamide | 60.0 |

Each composition was first thoroughly blended by mixing and then was continuously pumped to the individually heated extruders maintained at 147° C. and 172° C. respectively, connected to the respective channels of the hopper. The average lip spacing was 30 mils, and from them issued a coalesced latent solvent containing two layer polyvinyl fluoride film which was immediately cooled by conducting it through a water quench bath maintained at 13° C. The latent solvent containing film was then continuously stretched first longitudinally 1.60× at 60° C. and transversely 2.65× at a temperature of 135° C. followed by "drying," that is, volatilization of remaining solvent by exposure for about 4 seconds to a temperature of about 195° C. The resulting film had a base layer of 1.07 mils and a top layer of 0.33 mil and the components of the dried film layers were as follows: the base layer, about 16% pigment and 83% polyvinyl fluoride; the top layer, 5% UV screen, 5% "Celite Super-Floss" and 90% polyvinyl fluoride. No distinct interface was observed between the layers.

The invention is also applicable to extrusion hoppers with more than two extrusion channels. One suitable apparatus with three channels is shown in FIGURE 3 to which reference now will be made.

In FIGURE 3 the numeral 50 indicates an extrusion hopper formed of an upper body member 52 and mating lower lip members 54 and 56. Within the upper body member 52 is enlarged chamber 58 having an elongated extrusion channel 60 extending downwardly therefrom.

The extrusion hopper body 50 can be formed in any manner desired. One convenient structure is provided by two body portions 52a and b having surfaces which are machined or otherwise shaped to define chamber 58 and channel 60.

Along the lower surface 62 of body member 52 the recesses that, with cooperating recesses in lip members 54 and 56, define second and third elongated chambers 64 and 66 and second and third elongated channels 65 and 67 extending therefrom. The lip members 54 and 56 as shown have their inner ends adjacent one another and therebetween define the hopper extrusion orifice 70. The surfaces 54a and 56a of the lip members constitute the walls of the extrusion orifice 70 and are essentially parallel. The outlets of extrusion channels 60, 65 and 67 terminate together at the inlet of extrusion orifice 70. If desired, however, the outlets of such channels may also sequentially terminate at points spaced from the inlet.

While not shown in detail, the lip members 54 and 56 can be mounted on and operate relative to the body member 52 in the same manner as indicated above with regard to the hopper of FIGURES 1 and 2. Hence, a number of supporting members 74 are provided on the body 52, and in turn support differential adjusting screws 76 adapted to urge the lip members 54 and 56 toward one another as desired.

A portion of each of the extrusion channels 60, 65 and 67, is defined by opposed parallel walls. A recess is located in one wall of each of the pair of these walls. Flexible elongated bars 80, 82 and 84, each of the length of the extrusion channels, are snugly received in those recesses. The inner surfaces of these bars serve, with the corresponding opposed wall portions of the channels, to define the channel dimensions at that location. Each of bars 80, 82 and 84 has associated with it adjusting screws 90, supported by the body or lip member through which it extends. A plurality (not shown) of such screws are associated with each bar, and are employed to urge the bars toward or away from the corresponding channel, as needed, as discussed above in connection with the analogous elements in FIGURES 1 and 2. While not shown, the unit can be provided with special channels for temperature control, and end plates or headers as needed for any particular practice.

As shown in FIGURE 3, it is preferred to have the portions of channels 60, 65 and 67 that include the bars 80, 82 and 84 defined with walls that are parallel to one another. With this arrangement, adjustment of the lips to provide the desired dimension of orifice 70 does not disturb an earlier adjustment of channels 65 and 67.

The embodiment of the invention as disclosed in FIGURE 3 is of particular interest for the preparation of film for the meat wrapping industry and similar applications. In tests of the invention with the three channel hopper, markedly improved gauge control was achieved by use of the adjusting bars.

As will be appreciated by those skilled in the art, the various parts of the hopper apparatus will be made of materials capable of withstanding the conditions imposed by any particular intended practice. In addition, while the invention has been described with certain detail, it will be appreciated that changes can be made without departing from its scope.

What is claimed is:
1. An extrusion hopper for the extrusion of a film consisting of a plurality of layers comprising:
   an elongated body member;
   elongated lip members attached to said body member,
   portions of the surface of at least one of said lip members cooperating with adjacent portions of the surface of said body member to define an extrusion channel therebetween;
   portions of the surfaces of said lip members being arranged in opposed relation and defining an extrusion orifice therebetween;
   means to move said lip members relative to each other to selectively adjust the dimensions of said extrusion orifice;
   said extrusion hopper having means defining at least another extrusion channel therewithin;
   said extrusion channels and said extrusion orifice being connected together and in open communication with each other;
   each of said extrusion channels having an elongated bar movably mounted therewithin for selectively adjusting the dimensions of said extrusion channels; and,
   means to move said elongated bars in said extrusion channels to thereby control the thickness of layers extruded therefrom without changing the dimensions of said extrusion orifice.
2. The extrusion hopper of claim 1 in which portions of the surfaces of each of said lip members cooperate with adjacent portions of the surface of said elongated body member to define said extrusion channels, said bars being received by said lip members in the surfaces thereof defining said extrusion channels, and said bars being adjustable relative to said lip members whereby portions of said extrusion channels dimensions can be controlled independent of said lip members.
3. The extrusion hopper of claim 1, said body member having a lower surface and having an elongated chamber located generally centrally in said body member and terminating as a downwardly extending first extrusion channel, said lip members being attached to the lower surface of said body member, one of said lip members being mounted on each side of said first extrusion channel, the inner ends of said lip members each terminating at the outlet of said first extrusion channel and cooperatively defining therebetween said extrusion orifice extending downwardly from said first extrusion channel, portions of the lower surface of said body member and adjacent portions of each of said lip members being shaped to define therebetween second and third elongated chambers and second and third elongated extrusion channels depending therefrom which terminate at the end of and are in open communication with said first extrusion channel, a recess in a wall of each of first, second and third extrusion channels, said bars being mounted in each of said recesses and means to adjust said bars along their length whereby portions of said extrusion channels can be controlled independent of said lip members.
4. The extrusion hopper of claim 3, said portions of said lip members and the opposed portions of the lower surface of said body member defining said second and third elongated extrusion channels being substantially parallel to each other whereby said extrusion orifice can be adjusted without change in the adjustment of said second and third extrusion channels.
5. The extrusion hoper of claim 1, an elongated tongue extending from said body member and having a tip portion, said lip members attached to said body member on each side of said tongue and cooperating with said tongue to define said extrusion channels, each of said lip members extending beyond the tip portion of tongue and cooperating with one another to define said extrusion orifice, and said bars being received by said lip members adjacent said tongue near its tip portion and cooperating with said tongue to define said extrusion channels at that position whereby portions of said channels dimensions can be controlled independent of said lip members.
6. The extrusion hopper of claim 5 in which portions of the sides of said tongue are generally parallel to one another, and said bars cooperate with said parallel side portions to define said extrusion channels.
7. The extrusion hopper of claim 5 including means cooperating with said bars to adjust selected portions thereof with respect to the corresponding adjacent portion of said tongue.
8. The extrusion hopper of claim 1,
   said body member consisting of a plurality of body portions;
   said body portions being connected together with opposed portions of the surfaces thereof defining an extrusion channel therebetween; and
   said bar in said extrusion channel defined in part by portions of the surface of said lip member being movable relative to said lip member to thereby selectively change the dimensions of said extrusion channel without changing the dimensions of said extrusion orifice defined by portions of the surfaces of said lip members.

References Cited

UNITED STATES PATENTS

| | | |
|---|---|---|
| 2,628,386 | 2/1953 | Thornberg. |
| 2,761,417 | 9/1956 | Russel et al. |
| 3,080,608 | 3/1963 | Van Riper. |
| 3,218,971 | 11/1965 | Rowland. |
| 3,235,437 | 2/1966 | Varlet. |
| 3,308,222 | 7/1967 | Kovacs. |

FOREIGN PATENTS

| | | |
|---|---|---|
| 294,878 | 4/1965 | Netherlands. |

WILLIAM J. STEPHENSON, Primary Examiner

U.S. Cl. X.R.

18—13